(12) United States Patent
Manos

(10) Patent No.: US 9,452,746 B2
(45) Date of Patent: Sep. 27, 2016

(54) SYSTEM AND METHOD FOR CONTROLLING A FLOW OF AIR

(75) Inventor: William T. Manos, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1335 days.

(21) Appl. No.: 12/895,909

(22) Filed: Oct. 1, 2010

(65) Prior Publication Data

US 2012/0080096 A1 Apr. 5, 2012

(51) Int. Cl.
| B60T 13/52 | (2006.01) |
| B60T 13/56 | (2006.01) |
| B60T 17/02 | (2006.01) |
| B60T 7/02 | (2006.01) |

(52) U.S. Cl.
CPC ............. *B60T 13/52* (2013.01); *B60T 7/02* (2013.01); *B60T 13/56* (2013.01); *B60T 17/02* (2013.01); *Y10T 137/0396* (2015.04)

(58) Field of Classification Search
CPC ........ B60T 13/46; B60T 13/52; B60T 13/56; B60T 13/66; B60T 13/72; B60T 17/02
USPC ....... 417/53; 60/397; 91/32; 92/98 R, 130 R, 92/130 A, 130 B
See application file for complete search history.

(56) References Cited

U.S. PATENT DOCUMENTS

| 3,950,946 | A | * | 4/1976 | Sakai | B60T 13/52 303/12 |
| 4,738,112 | A | * | 4/1988 | Nomura et al. | 60/721 |
| 5,299,370 | A | * | 4/1994 | Gyori et al. | 37/347 |
| 5,520,517 | A | * | 5/1996 | Sipin | 417/44.3 |
| 5,526,517 | A | * | 6/1996 | Jones et al. | 707/999.008 |
| 5,918,462 | A | * | 7/1999 | Mitani | B60T 13/52 123/339.14 |
| 5,961,189 | A | * | 10/1999 | Lutteke et al. | 303/114.3 |
| 6,270,322 | B1 | * | 8/2001 | Hoyt | 417/355 |
| 6,301,883 | B1 | * | 10/2001 | Fulks et al. | 60/397 |
| 6,324,845 | B1 | * | 12/2001 | Fulks | B60T 13/52 60/397 |
| 7,475,951 | B2 | * | 1/2009 | Ichikawa | B60K 6/543 188/356 |

FOREIGN PATENT DOCUMENTS

DE 8223654 U1 8/1984

* cited by examiner

*Primary Examiner* — Peter J Bertheaud
(74) *Attorney, Agent, or Firm* — Quinn Law Group, PLLC

(57) ABSTRACT

A method for controlling a flow of air includes establishing a level of vacuum in a booster device by generating the flow of air from the booster device using a pump. The method also includes determining whether the level of vacuum in the booster device has reached a predetermined value. The method additionally includes terminating the flow of air from the booster device when the level of vacuum in the booster device has reached the predetermined value. A system for controlling a flow of air according to the method may be incorporated into a motor vehicle having an internal combustion engine that is adapted to drive the pump.

7 Claims, 2 Drawing Sheets

SYSTEM AND METHOD FOR CONTROLLING A FLOW OF AIR

TECHNICAL FIELD

The invention relates to a system and method for controlling a flow of air.

BACKGROUND

Similar to positive pressure, a negative pressure or vacuum may be used to assist in the performance of a variety of functions. To generate a vacuum, a device is typically employed to remove at least some portion of a gas present in a sealed volume.

In motor vehicles, vacuum is often used to generate a load assist for actuation of various on-board systems, such as vehicle brakes. When employed to assist in the actuation of motor vehicle brakes, a booster device or a vacuum servo is used to accumulate and store the vacuum. The stored vacuum is subsequently used to multiply the braking force applied by an operator at the brake pedal, thereby decreasing the effort the operator is required to exert during braking of the vehicle.

Depending on the type of engine or other powerplant employed by a particular motor vehicle, either the engine's manifold vacuum or a separate vacuum pump may be used to provide a vacuum for accumulation by the booster device. If a vacuum pump is used in the motor vehicle, it is typically driven directly by the engine.

SUMMARY

A method is provided for controlling a flow of air. The method includes establishing a level of vacuum, i.e., negative pressure, in a booster device by generating the flow of air from the booster device using a pump. The method also includes determining whether the level of vacuum in the booster device has reached a predetermined value. The method additionally includes terminating the flow of air from the booster device when the level of vacuum in the booster device has reached the predetermined value.

The act of terminating the flow of air may be accomplished via a directional control valve such that the termination of the flow of air reduces a pressure differential across the pump. Additionally, the act of terminating the flow of air may include changing the direction of the flow of air and closing a flow path between the pump and the booster device.

The act of changing the direction of the flow of air may include opening a flow path between a negative pressure chamber of the pump and a positive pressure chamber of the pump. Additionally, the act of changing the direction of the flow of air may include opening a path for a flow of air between the pump and the atmosphere.

The method may additionally include filtering a flow of air between the atmosphere and the pump via a filter.

According to the method, the booster device may be a vacuum servo booster for an automobile braking system.

Additionally, a system for controlling a flow of air in accordance with the above method is also provided. Such a system may be incorporated into a motor vehicle having an internal combustion engine that is adapted to drive the pump.

The above features and advantages and other features and advantages of the present invention are readily apparent from the following detailed description of the best modes for carrying out the invention when taken in connection with the accompanying drawings.

DETAILED DESCRIPTION

Figure 1:
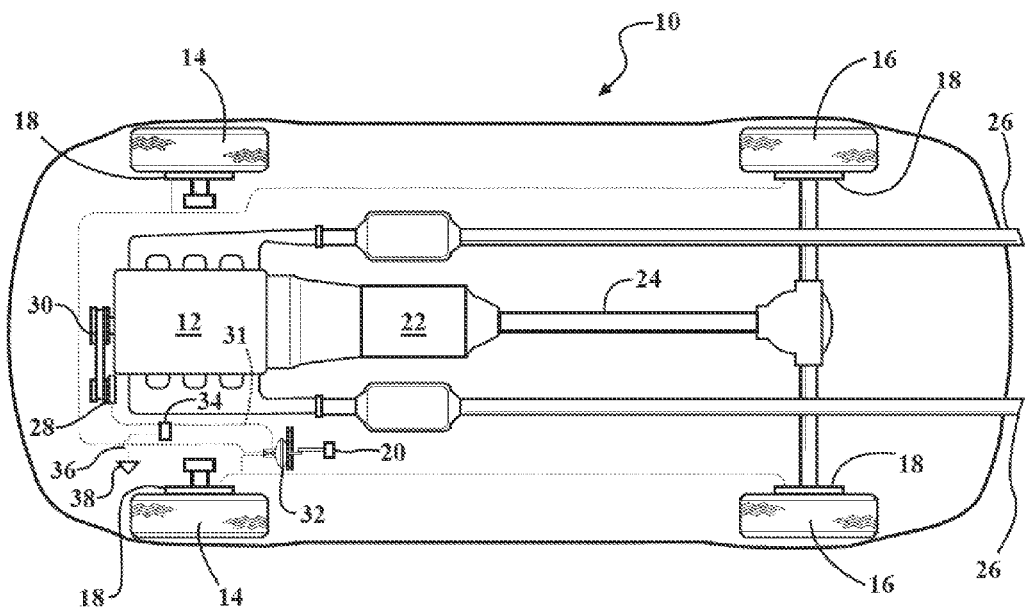
FIG. 1 is a schematic plan view of a motor vehicle employing a control valve to reduce a pressure differential across a vacuum pump by opening a flow path between the pump and the atmosphere.

Referring to the drawings, wherein like reference numbers refer to like components, FIG. 1 shows a schematic view of a motor vehicle 10. The vehicle 10 incorporates a powertrain that includes a compression-ignition type internal combustion engine 12. Although a compression-ignition type engine 12 is shown, nothing precludes the use of a spark-ignition engine in its place. Engine 12 is adapted for driving wheels 14 and/or wheels 16 to propel the vehicle.

Vehicle 10 is slowed or retarded by a friction braking system that includes braking members 18. Braking members 18 are actuated by an operator of the vehicle 10 via a brake pedal 20 when vehicle deceleration is desired. Braking members 18 typically include components such as brake rotors, brake calipers and brake pads that are commonly hydraulically actuated, as known to those skilled in the art, and are not explicitly shown. Braking members 18 are adapted to apply a frictional force to the wheels 14 and 16 for reducing speed of vehicle 10 by dissipating the vehicle's kinetic energy as heat.

Engine 12 applies its torque to the driven wheels 14 and/or 16 through a transmission 22 and via a drive or a propeller shaft 24. The engine 12 emits gases that are a product of the combustion process via an exhaust system 26 to the ambient. Engine 12 includes internal components such as a crankshaft, reciprocating pistons, and connecting rods, none of which are shown, but the presence of which will be appreciated by those skilled in the art. The pistons transfer the force of combustion to the crankshaft and thereby rotate the engine 12. Engine 12, being a compression-ignition type, is not throttled, and therefore does not generate significant engine vacuum.

Engine 12 drives a vacuum pump 28. As shown, pump 28 is driven via a belt 30 directly from the engine 12. Although a belt-driven pump is shown, other methods to drive the pump directly from the engine, such as via a cam (not shown) may also be used. Such direct driving of pump 28 generates parasitic drag on engine 12, and decreases available power output from the engine, as well as reduces the engine's fuel efficiency. Typically, pump 28 receives its internal lubrication and sealing via pressurized oil supplied by engine 12. Pump 28 is adapted to evacuate atmospheric air from the booster device 32, and, as defined herein, to generate a flow of air from the booster device. Accordingly, the evacuation of air from booster device 32 stores energy in the booster device in the form of vacuum.

As shown, booster device 32 is a vacuum servo employed to provide load assistance for actuating braking members 18 at the brake pedal 20 by a controlled release of energy stored as vacuum, i.e., a controlled flow of air into the booster device. Thus, booster device 32 provides a reduction of effort that is required to be applied at brake pedal 20 by an operator of vehicle 10 during a braking maneuver. Although not shown, a vacuum servo similar in operation to the booster device 32 may also be employed to control a turbocharger waste-gate, actuate a throttle driver for an automobile cruise control servomechanism or a motor for moving a damper in a ventilation system of vehicle 10. Vehicle 10 additionally includes a mechanical control valve 34. Control valve 34 may be positioned anywhere along a path of air flow 31, or be integrated into the pump 28 or into the booster device 32.

Control valve 34 is a directional valve adapted to reduce a pressure differential across the pump 28 by controlling a flow of air between the pump and the booster device 32. Control valve 34 terminates the flow of air out of the booster device 32 when a level of vacuum in the booster device has reached a predetermined value. With respect to booster device 32, such a predetermined level of vacuum is established based on the amount of vacuum required to generate the desired load assistance at the brake pedal 20, and based on the structural characteristics of the booster device. The termination of the flow of air out of the booster device 32 results in a reduction of pressure differential across the pump 28. Such a reduction in the pressure differential, in turn, reduces parasitic drag on engine 12 when additional vacuum is not required.

The termination of the flow of air from the booster device 32 includes changing the direction of the flow of air into the control valve 34. The direction of the flow of air may be changed from the booster device 32 to the atmosphere, i.e., ambient, as shown in FIG. 1. In an approach that changes the direction of the flow of air to the atmosphere, a flow path 36 is employed and may include a filter 38 adapted for filtration of the flow of ambient air between the atmosphere and the pump 28. Additionally, as shown in FIG. 2, the direction of the flow of air may also be changed by opening a flow path between a negative pressure chamber 40 and a positive pressure chamber 42 of pump 28, by connecting flow paths 44 and 46.

Figure 2:
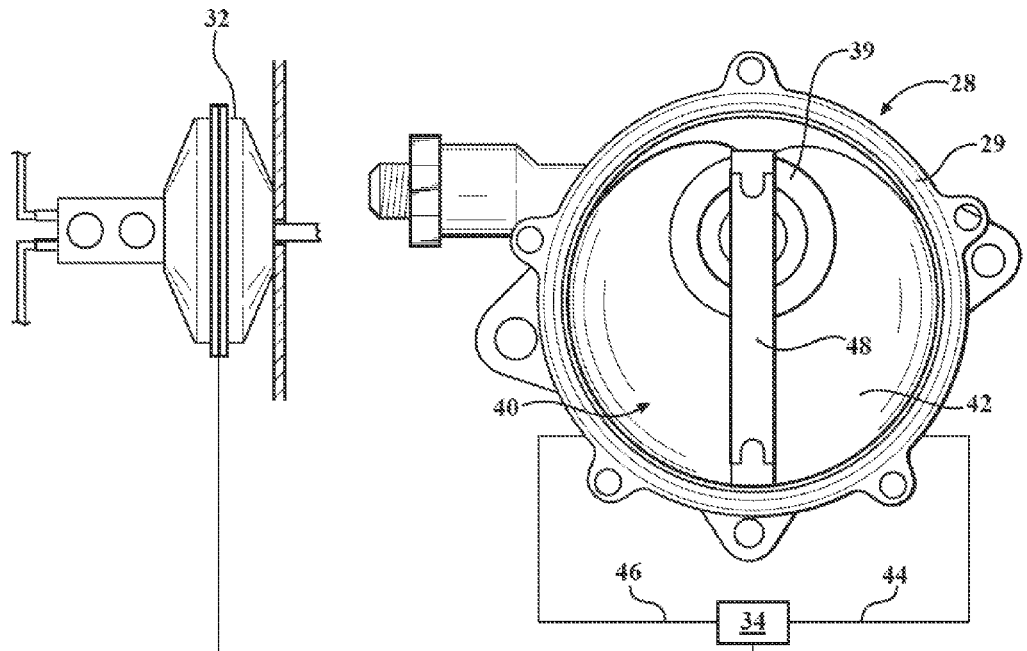
FIG. 2 is a schematic illustration of the control valve shown in FIG. 1 employed to reduce a pressure differential across the pump by opening a flow path between negative and positive pressure chambers of the pump.

FIG. 2 shows an example of a positive displacement vacuum pump 28. As shown, pump 28 includes a housing 29 with an internal contour. Pump 28 of FIG. 2 employs a rotor 39 and a single vane 48 for increasing volume in the vacuum or negative pressure chamber 40, while decreasing volume in the positive pressure chamber 42. Vane 48 is driven by rotor 39, such that, during pump operation, the vane slides relative to the rotor, while at the same time following the internal contour of housing 29. Air is drawn into pump 28 as the volume in the negative chamber 40 is increased, and air is pushed out of the pump as the volume in the positive chamber 42 decreases, thereby generating a flow of air out of and creating vacuum within the booster device 32. Pump 28 may also employ an alternative design, for example having a Roots blower construction (not shown), to generate vacuum for booster device 32. Therefore, during operation of the vehicle 10 when braking members 18 are not being used, such as during steady state driving, control valve 34 reduces the pressure differential between pressure chambers 40 and 42, and terminates the flow of air out of the booster device 32.

Figure 3:
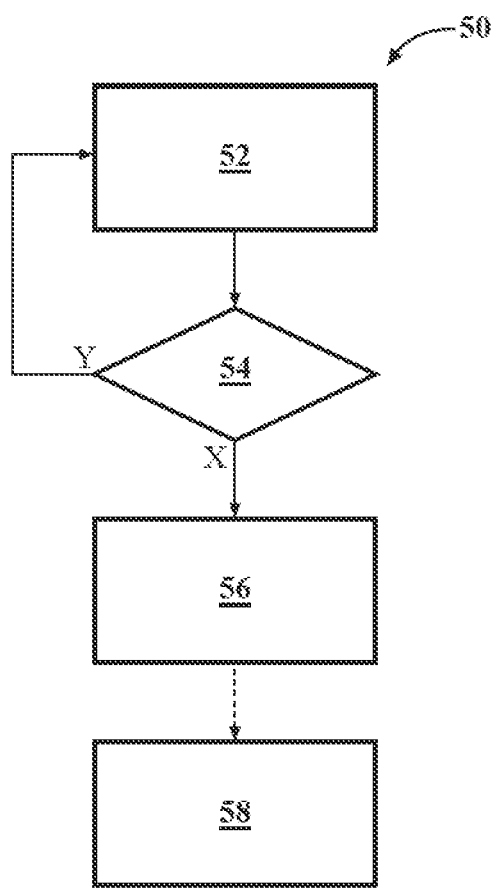
FIG. 3 is a flow chart illustrating a method controlling a flow of air in the motor vehicle depicted in FIG. 1.

FIG. 3 depicts a method 50 for controlling a flow of air between the pump 28 and the booster device 32 in the vehicle 10. The method commences in frame 52 with engine 12 running and supplying the flow of air from booster device 32 via pump 28. The method then proceeds from frame 52 to frame 54 for determining whether the level of vacuum in the booster device 32 has reached the predetermined value. If in frame 54 it is determined that the level of vacuum in the booster device 32 has reached the predetermined value, the method proceeds to frame 56. In FIG. 3, the level of vacuum in the booster device 32 reaching the predetermined value is denoted by a character "X".

In frame 56, the method includes terminating the flow of air from the booster device 32 by changing the direction of the flow of air into the control valve 34. As described above with respect to FIG. 1, such changing of the direction of the flow of air may include opening the flow path between negative pressure chamber 40 and positive pressure chamber 42 of the pump 28. Additionally, as described above with respect to FIG. 2, such changing of the direction of the flow of air may likewise include opening flow path 36 between pump 28 and the atmosphere, i.e., opening the pump up to ambient pressure.

If in frame 54 it is determined that the level of vacuum in the booster device 32 has not reached the predetermined value, the method reverts to frame 52 for continued generation of vacuum in the booster device. In FIG. 3, the level of vacuum in the booster device 32 not reaching the predetermined value is denoted by a character "Y". The method may also include restarting the flow of air from the booster device 32 in frame 58, when it is determined that the level of vacuum in the booster device has again fallen below the predetermined value. The level of vacuum in the booster device 32 typically will be reduced and will fall below the predetermined value when the booster device has been called upon to provide load assistance, such as during a braking maneuver of vehicle 10.

While the best modes for carrying out the invention have been described in detail, those familiar with the art to which this invention relates will recognize various alternative designs and embodiments for practicing the invention within the scope of the appended claims.

The invention claimed is:

1. A method for controlling a flow of air, the method comprising:
   establishing a level of vacuum in a booster device by generating the flow of air from the booster device using a pump having a negative pressure chamber and a positive pressure chamber;
   determining whether the level of vacuum in the booster device has reached a predetermined value; and
   terminating the flow of air from the booster device via a directional control valve, such that a pressure differential across the pump is reduced when the level of vacuum in the booster device has reached the predetermined value;
   wherein said terminating the flow of air includes:
      closing a flow path between the pump and the booster device; and
      changing the direction of the flow of air by opening a flow path between the negative pressure chamber and the positive pressure chamber of the pump.

2. The method of claim 1, wherein the booster device is a vacuum servo booster for an automobile braking system.

3. A system for controlling a flow of air, the system comprising:
   a booster device configured to provide a vacuum assist when a level of vacuum has been established in the device;
   a pump having a negative pressure chamber and a positive pressure chamber and configured to establish the level of vacuum in the booster device by generating the flow of air from the booster device; and a directional control valve configured to terminate the flow of air from the booster device when the level of vacuum in the booster device has reached a predetermined value, such that a pressure differential across the pump is reduced;

wherein the directional valve terminates the flow of air by closing a flow path between the pump and the booster device, and changes the direction of the flow of air by opening a flow path between the negative pressure chamber and the positive pressure chamber of the pump.

4. The system of claim 3, wherein the booster device is a vacuum servo booster for an automobile braking system.

5. A motor vehicle comprising:

an internal combustion engine;

a booster device configured to provide a vacuum assist when a level of vacuum has been established in the device; and a system for controlling a flow of air from the booster device, the system including:

a pump having a negative pressure chamber and a positive pressure chamber and configured to establish the level of vacuum in the booster device by generating the flow of air from the booster device; and a directional control valve configured to terminate the flow of air from the booster device when the level of vacuum in the booster device has reached a predetermined value, such that a pressure differential across the pump and a parasitic load on the engine are reduced;

wherein the directional valve terminates the flow of air by closing a flow path between the pump and the booster device, and changes the direction of the flow of air by opening a flow path between the negative pressure chamber and the positive pressure chamber of the pump.

6. The vehicle of claim 5, further comprising a braking system, wherein the booster device is a vacuum servo booster for the braking system.

7. The vehicle of claim 5, wherein the engine is a compression-ignition type.

* * * * *